(12) United States Patent
Zeng et al.

(10) Patent No.: US 11,598,876 B2
(45) Date of Patent: Mar. 7, 2023

(54) SEGMENTING GROUND POINTS FROM NON-GROUND POINTS TO ASSIST WITH LOCALIZATION OF AUTONOMOUS VEHICLES

(71) Applicant: NVIDIA CORPORATION, Santa Clara, CA (US)

(72) Inventors: Di Zeng, Sunnyvale, CA (US); Derik Schroeter, Fremont, CA (US); Mengxi Wu, Mountain View, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 243 days.

(21) Appl. No.: 16/901,655

(22) Filed: Jun. 15, 2020

(65) Prior Publication Data
US 2020/0393566 A1 Dec. 17, 2020

Related U.S. Application Data

(60) Provisional application No. 62/861,513, filed on Jun. 14, 2019.

(51) Int. Cl.
*G01S 17/894* (2020.01)
*G01C 21/30* (2006.01)
(Continued)

(52) U.S. Cl.
CPC .......... *G01S 17/894* (2020.01); *G01C 21/30* (2013.01); *G01S 7/4808* (2013.01); *G01S 17/931* (2020.01);
(Continued)

(58) Field of Classification Search
CPC .... G01S 17/894; G01S 17/931; G01S 7/4808; G01C 21/30; B60W 60/0025; B60W 2420/52; B60W 2520/16; B60W 2520/18
See application file for complete search history.

(56) References Cited

U.S. PATENT DOCUMENTS

| 2016/0171893 A1* | 6/2016 | Chen ............... G01S 17/931 |
| | | 701/300 |
| 2019/0128677 A1* | 5/2019 | Naman ............ G01C 21/20 |
| 2020/0150233 A1* | 5/2020 | Nian .............. G01S 7/4808 |

OTHER PUBLICATIONS

Bogoslavskyi, I., & Stachniss, C., Fast range image-based segmentation of sparse 3D laser scans for online operation, IEEE International Conference on Intelligent Robotsand Systems, Nov. 2016, pp. 163-169. https://doi.org/10.1109/IROS.2016.7759050.

(Continued)

*Primary Examiner* — Tyler J Lee
*Assistant Examiner* — Yufeng Zhang
(74) *Attorney, Agent, or Firm* — Maschoff Brennan

(57) ABSTRACT

According to an aspect of an embodiment, operations may comprise receiving, from a LIDAR mounted on a vehicle, a first 3D point cloud comprising points of a region around the vehicle as observed by the LIDAR. The operations may also comprise accessing an HD map comprising a second 3D point cloud comprising points of the region around the vehicle. The operations may also comprise segmenting LIDAR ground points from LIDAR non-ground points in the first 3D point cloud. The operations may also comprise segmenting map ground points from map non-ground points in the second 3D point cloud. The operations may also comprise determining a pose of the vehicle by matching the LIDAR ground points to the map ground points and by matching the LIDAR non-ground points to the map non-ground points.

18 Claims, 12 Drawing Sheets

(51) Int. Cl.
G01S 17/931 (2020.01)
G01S 7/48 (2006.01)
B60W 60/00 (2020.01)

(52) U.S. Cl.
CPC ..... *B60W 60/0025* (2020.02); *B60W 2420/52* (2013.01); *B60W 2520/16* (2013.01); *B60W 2520/18* (2013.01)

(56) References Cited

OTHER PUBLICATIONS

Himmelsbach, M., Hundelshausen, F. V., & Wuensche, H. J., Fast segmentation of 3D point clouds for ground vehicles. IEEE Intelligent Vehicles Symposium, Proceedings, Jun. 2010, pp. 560-565. https://doi.org/10.1109/IVS.2010.5548059.

Petrovskaya, A., & Thrun, S., Model Based Vehicle Tracking for Autonomous Driving in Urban Environments. In Robotics: Science and Systems IV., Robotics: Science and Systems Foundation, Jun. 2008. https://doi.org/10.15607/RSS.2008.IV.023.

Besl, P. J., & McKay, N. D., A method for registration of 3-D shapes, IEEE Transactions on Pattern Analysis and Machine Intelligence, vol. 14, No. 2, Feb. 1992, pp. 239-256. https://doi.org/10.1109/34.121791.

Segal, A., Haehnel, D., & Thrun, S., Generalized-ICP. Robotics: Science and Systems, 5, Jun. 2009, pp. 168-176.

Serafin, J., & Grisetti, G., NICP: Dense normal based point cloud registration, IEEE International Conference on Intelligent Robots and Systems, Dec. 2015, pp. 742-749. https://doi.org/10.1109/IROS.2015.7353455.

\* cited by examiner

SEGMENTING GROUND POINTS FROM NON-GROUND POINTS TO ASSIST WITH LOCALIZATION OF AUTONOMOUS VEHICLES

CROSS-REFERENCE TO A RELATED APPLICATION

This patent application claims the benefit of and priority to U.S. Provisional App. No. 62/861,513 filed Jun. 14, 2019, which is incorporated by reference in the present disclosure in its entirety for all that it discloses.

FIELD

The embodiments discussed herein are related to maps for autonomous vehicles, and more particularly to segmenting ground points from non-ground points to assist with localization of autonomous vehicles.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise receiving, from a light detection and ranging sensor (LIDAR) mounted on a vehicle, a first three dimensional (3D) point cloud comprising points of a region around the vehicle as observed by the LIDAR. The operations may also comprise accessing a high definition (HD) map comprising a second 3D point cloud comprising points of the region around the vehicle. The operations may also comprise segmenting LIDAR ground points from LIDAR non-ground points in the first 3D point cloud. The operations may also comprise segmenting map ground points from map non-ground points in the second 3D point cloud. The operations may also comprise determining a pose of the vehicle by matching the LIDAR ground points to the map ground points and by matching the LIDAR non-ground points to the map non-ground points.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
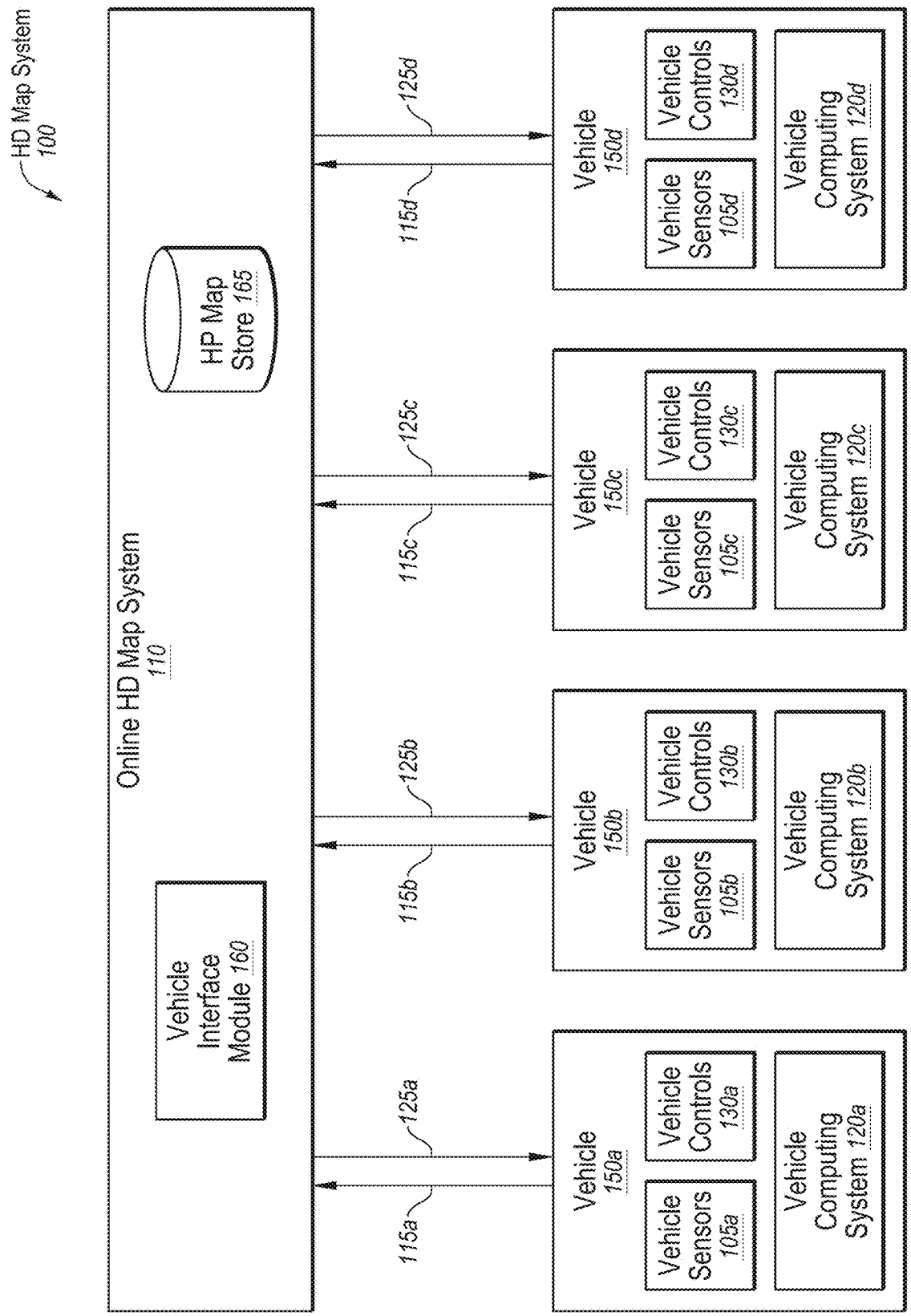
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may segment ground points from non-ground points to assist with localization of autonomous vehicles. In some embodiments, LIDAR localization accuracy may be greatly affected by dynamic objects like cars and trucks, and the effect can be worse when a vehicle upon which the LIDAR is mounted is surrounded by traffic. For example, points of vehicles on a LIDAR scan, which typically are on points near the tires or the bottom parts of the vehicles, tend to find correspondences to the ground points in the HD map, which may create a large error in the roll, pitch, and altitude (e.g., z value) in the estimated pose of the LIDAR-mounted vehicle. Therefore, in some embodiments, a ground-to-ground (G2G) matching and a non-ground-to-non-ground (N2N) matching may be used during localization to reduce the effect of dynamic objects in a LIDAR-based localization and to optimize a runtime performance and increase a convergence radius. As a result, pose errors from incorrect correspondences, especially in the roll, pitch, and altitude of the pose, may be greatly reduced.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150*a-d*) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
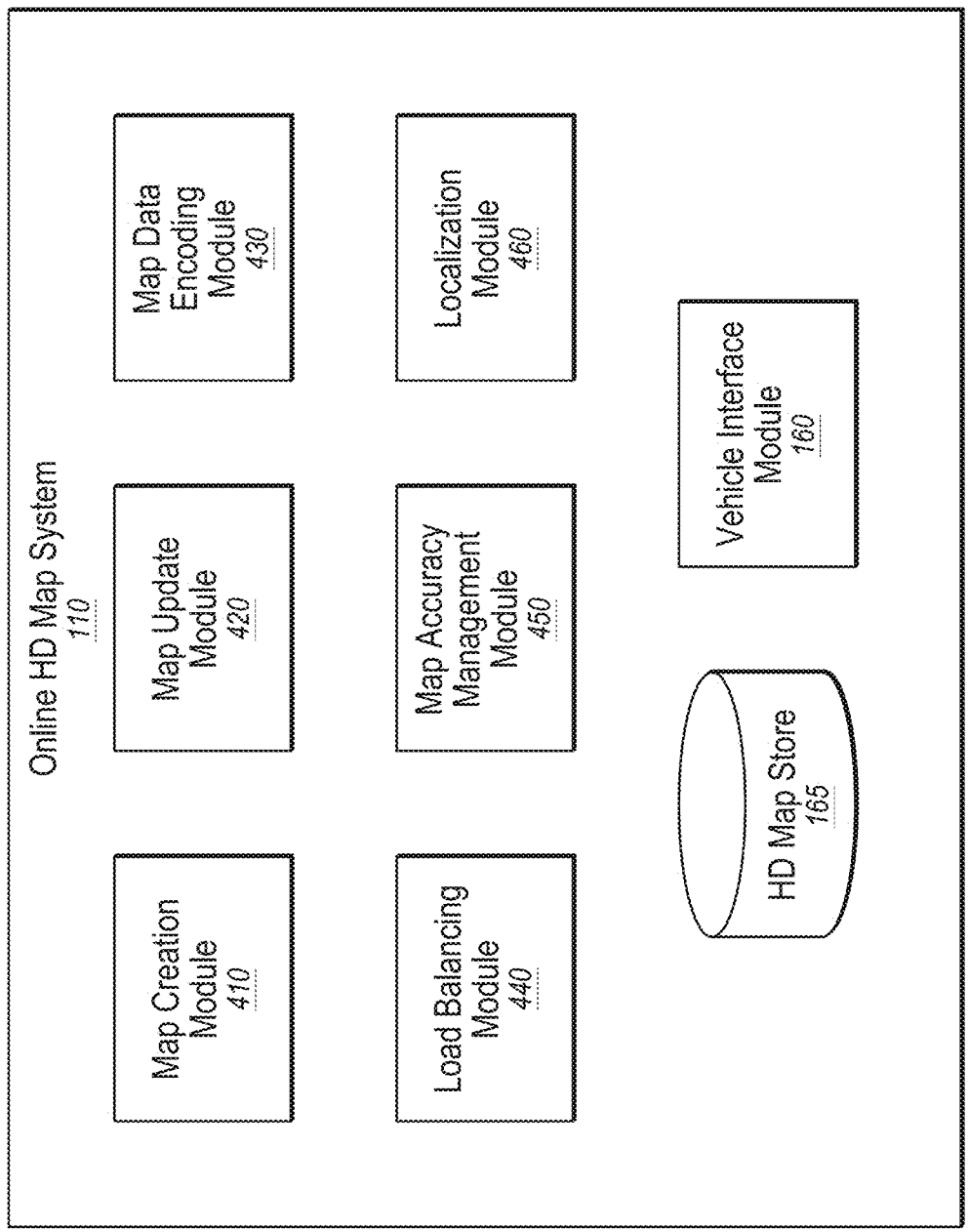
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
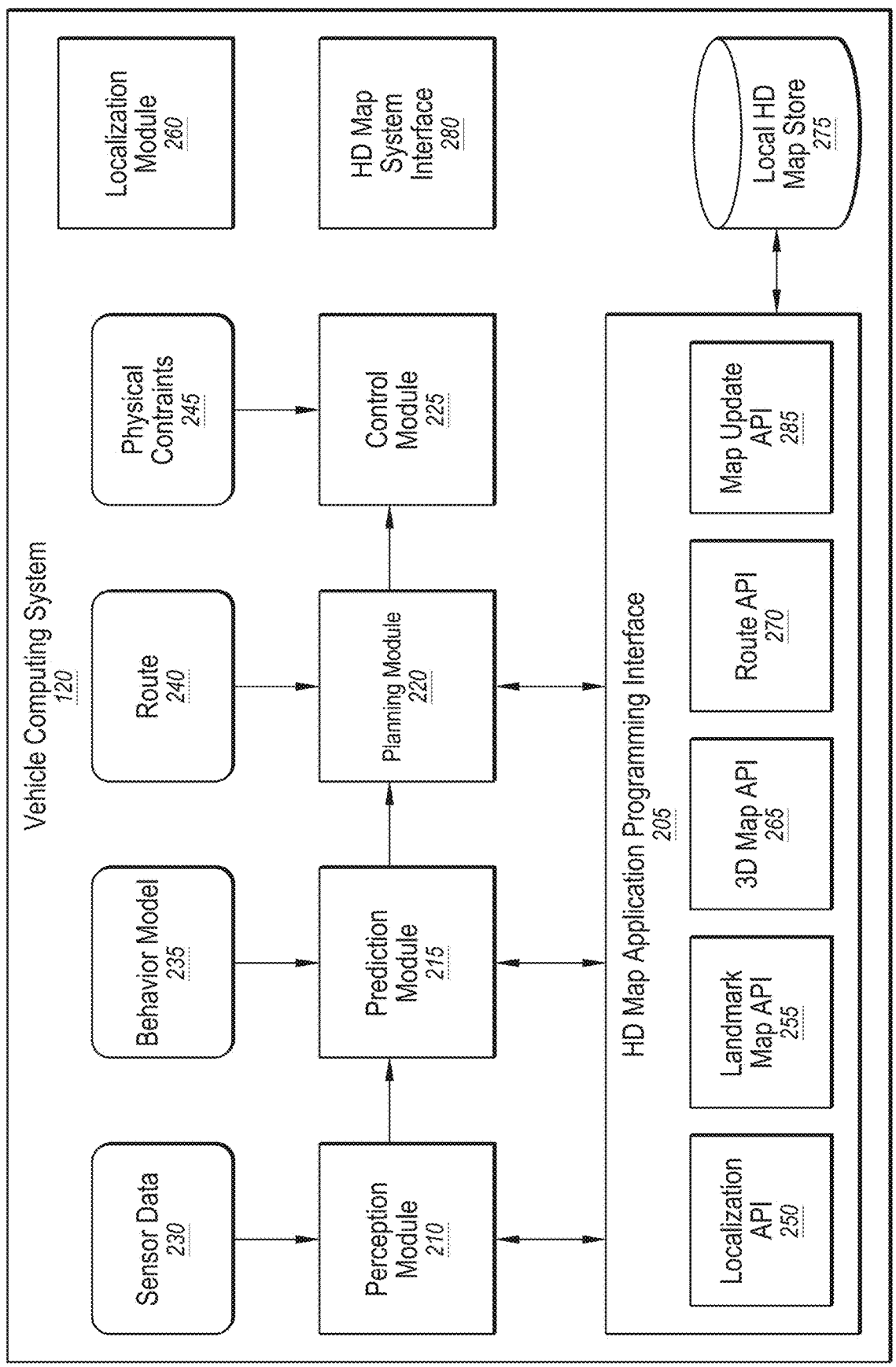
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a localization module 260, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
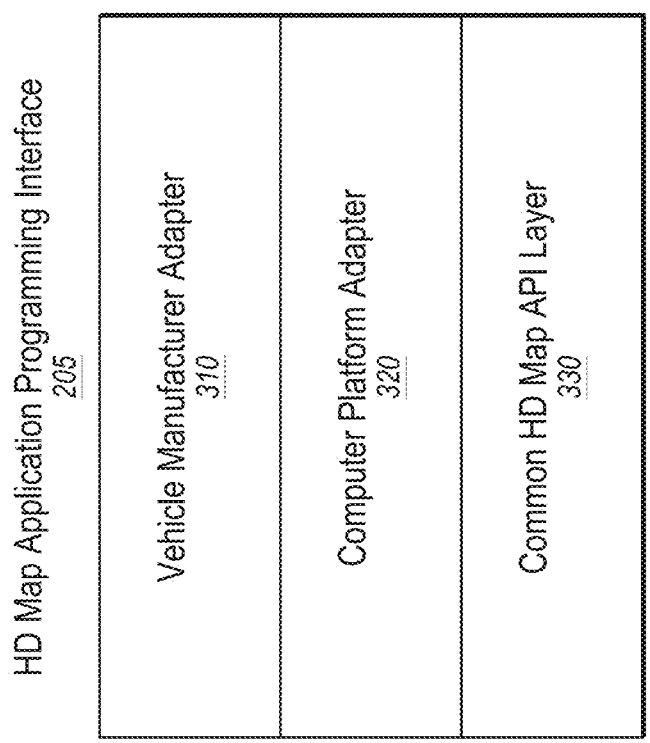
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
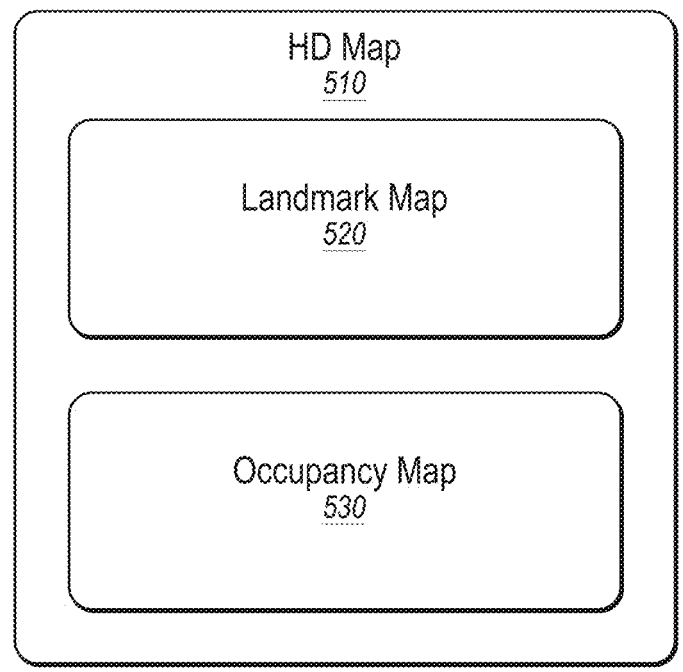
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
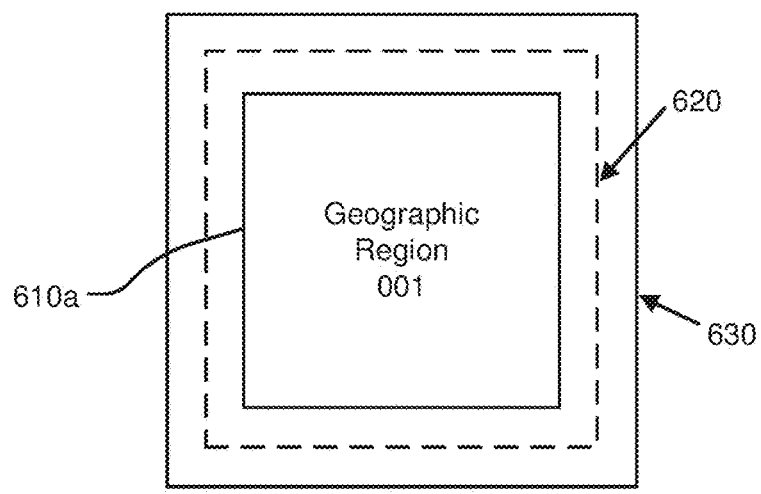
FIGS. 6A-6B illustrate example geographical regions defined in an HD map.
Figure 6B:
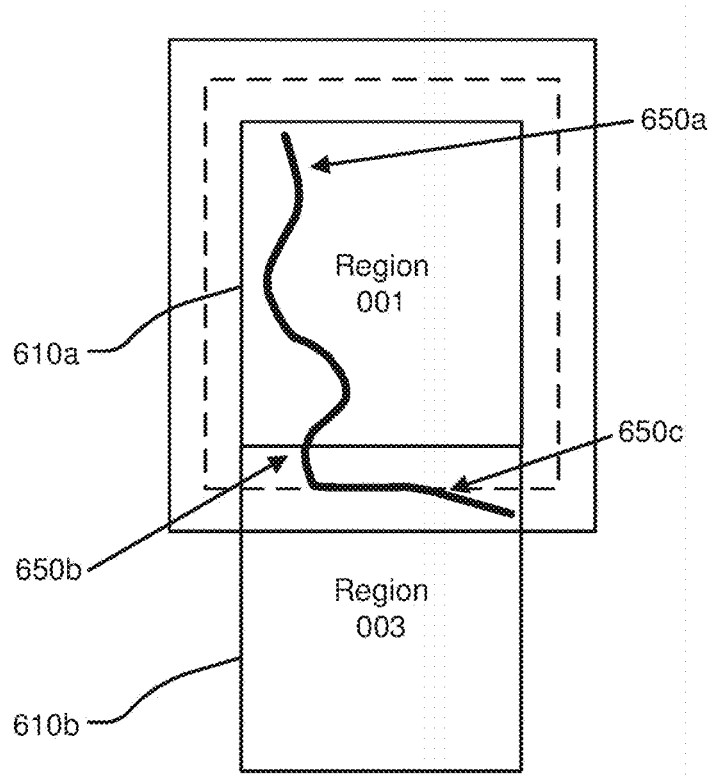

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
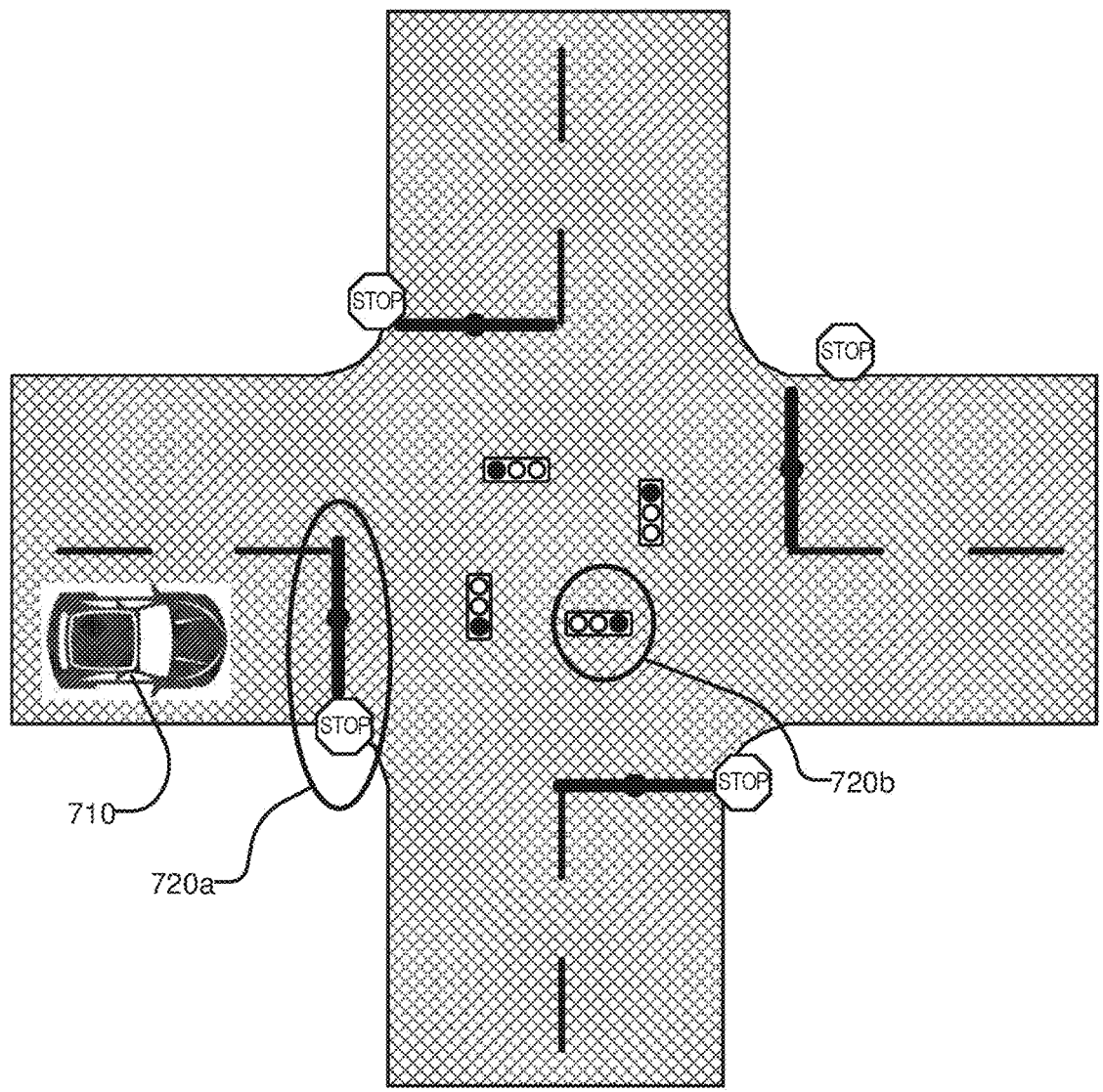
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
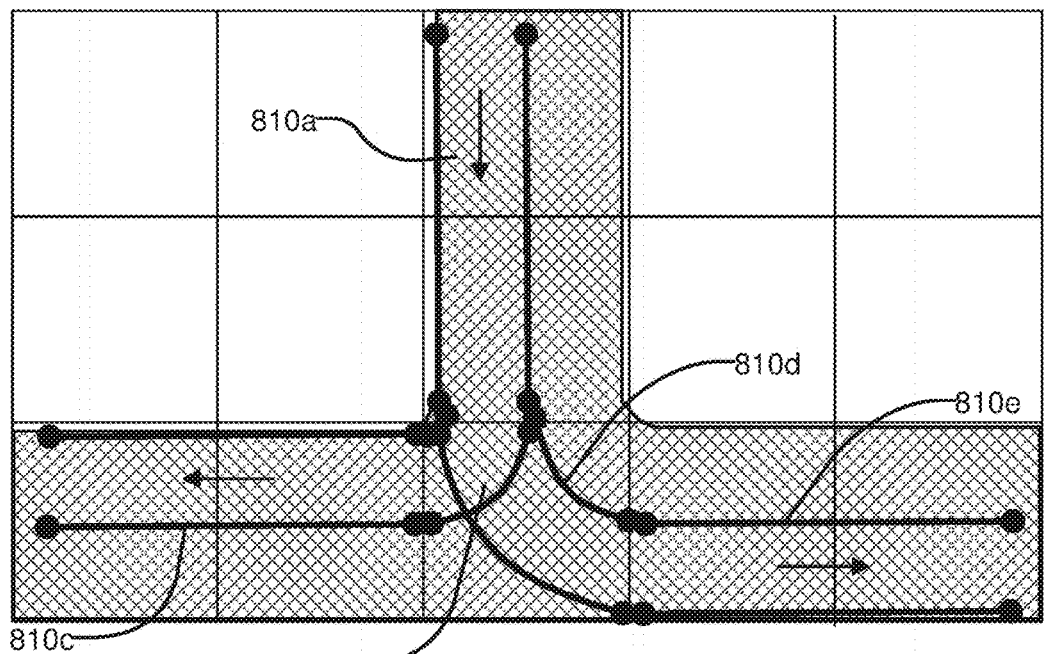
FIGS. 8A-8B illustrates example lane elements and relationships between lane elements in an HD map.
Figure 8B:
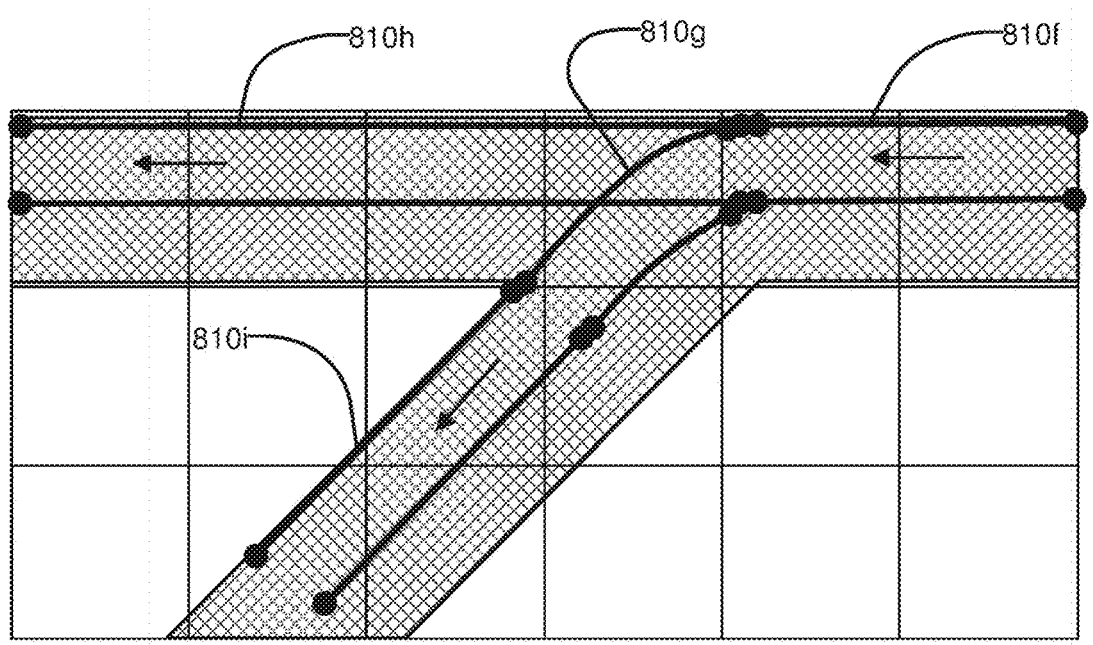

FIGS. 8A-B illustrate lane elements and relations between lane elements in an HD map. FIG. 8A illustrates an example of a T-junction in a road illustrating a lane element 810a that may be connected to lane element 810c via a turn lane 810b and is connected to lane 810e via a turn lane 810d. FIG. 8B illustrates an example of a Y-junction in a road illustrating label 810f connected to lane 810h directly and connected to lane 810i via lane 810g. The HD map system 100 may determine a route from a source location to a destination location as a sequence of connected lane elements that can be traversed to reach from the source location to the destination location.

Ground Non-Ground Localization

In some embodiments, LIDAR localization accuracy may be greatly affected by dynamic objects like cars and trucks.

The effect can be worse when a vehicle upon which the LIDAR is mounted is surrounded by traffic. For example, points of vehicles on a LIDAR scan, which typically are on points near the tires or the bottom parts of the vehicles, tend to find correspondences to the ground points in the HD map. These wrong correspondences may cause the localizer to move towards these dynamic objects. The effects of the dynamic objects may be more dramatic when the field-of-view (FOV) of the LIDAR is reduced (either by traffic or limited by hardware).

Figure 9:
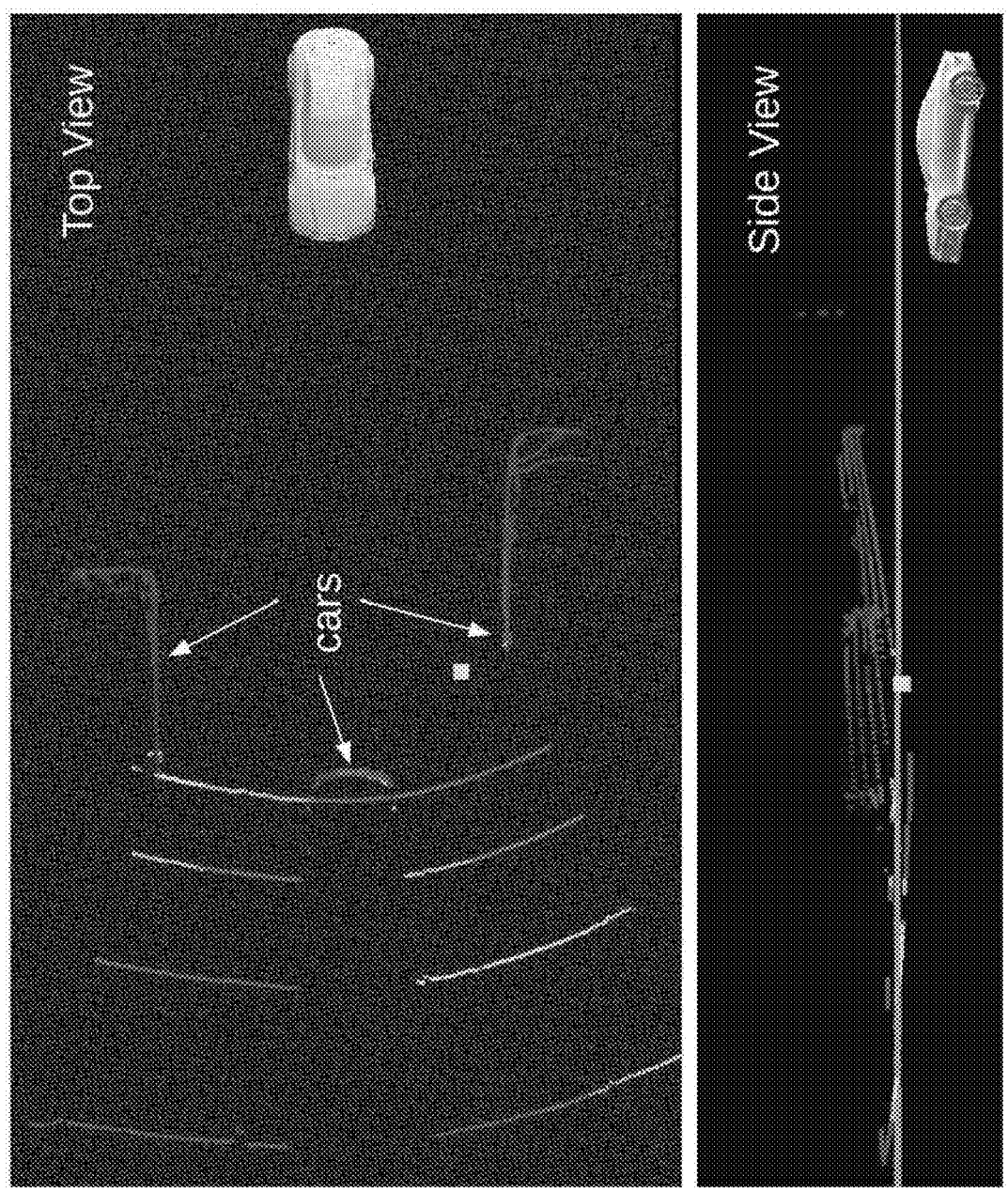
FIG. 9 illustrates points on dynamic objects in a LIDAR scan inaccurately aligning with points on the ground of an HD map.

FIG. 9 illustrates points on dynamic objects in a LIDAR scan inaccurately aligning with points on the ground of an HD map. As disclosed in FIG. 9, a relatively small FOV LIDAR scan may align inaccurately to the HD map points. For example, during the ICP process, the points on the cars surrounding the LIDAR-mounted vehicle may tend to align to the points on the ground in the HD map, which may create a large error in the altitude value (e.g., z value) and the pitch value in the estimated car pose of the LIDAR-mounted vehicle (e.g., the pitch value may be inaccurately raised, and the altitude value may be inaccurately lowered). The misalignment may also create a large error in the roll in the estimated car pose of the LIDAR-mounted vehicle.

In some embodiments, a ground-to-ground (G2G) matching and a non-ground-to-non-ground (N2N) matching may be used during localization to reduce the effect of dynamic objects in a LIDAR-based localization and to optimize a runtime performance and increase a convergence radius. For example, since most of the dynamic objects such as cars may be non-ground objects, and since most of the dynamic objects are usually on a road where there are no other non-ground static objects nearby, the localization module 260 of the vehicle computing system 120 may segment a current LIDAR scan by detecting the ground and clustering the points into two point clouds: ground points and non-ground points. This ground plane segmentation may be achieved relatively fast with reasonable accuracy because of its relatively simple geometry. For example, the system may use a random sample consensus (RANSAC) algorithm or a range-based segmentation algorithm. The same segmentation may be applied to the HD map, in the map making process and/or in real-time, so that ground segmentation labels can be looked up and/or generated in live localization. The system may match only the points with the consistent labels (e.g., ground or non-ground) between the LIDAR scan and the HD map. By doing this, LIDAR scan points from the cars in FIG. 9 may no longer correspond to the map ground points. As a result, pose errors from incorrect correspondences, especially in the roll, pitch, and altitude of the pose, may be greatly reduced.

Figure 10:
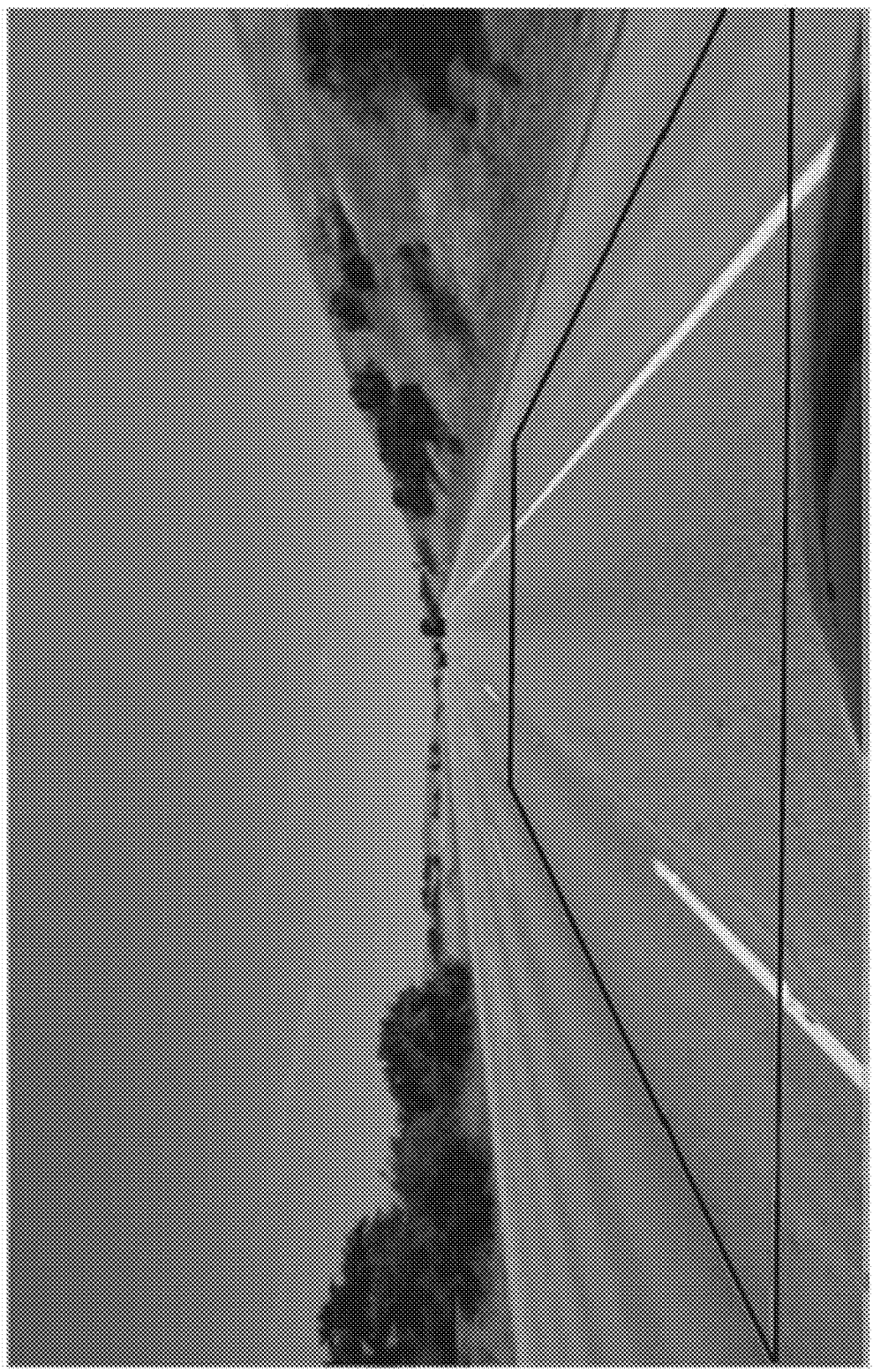
FIG. 10 illustrates a ground plane in front of a vehicle.

In some embodiments, the localization module 260 of the vehicle computing system 120 may determine the roll and the pitch of a vehicle by inspecting the ground plane. For example, if the ground plane is at an angle (e.g., a slope), the vehicle may be likely to be at the same angle and therefore have the same roll and pitch values. The localization module 260 may determine a ground plane based on sensor data, for example, using points from a LIDAR scan. FIG. 10 illustrates a ground plane in front of a vehicle. For example, the localization module 260 may identify points that are close to the vehicle and immediately in front of the vehicle (e.g., the region outlined in FIG. 10) and fit a plane through those points.

In some embodiments, the localization module 260 may determine a ground plane by determining an approximate location of the vehicle, for example using GPS, and then loading an OMap point cloud at that location and identifying the ground plane in that portion of the point cloud.

In some embodiments, the localization module 260 may determine a ground plane by collecting sensor data, for example a LIDAR scan, and identifying a ground plane in the LIDAR scan. The localization module 260 may have a predetermined estimate of the height of the LIDAR (e.g., based on vehicle manufacturer information). The localization module 260 may use the height to determine locations of ground points and may fit a plane through these points.

Determining Roll, Pitch, and Altitude Values of a Vehicle Using a Ground Plane

In some embodiments, GPS data may provide inaccurate altitude values for a vehicle, but the localization module 260 may use GPS data to determine a location (e.g., a latitude and a longitude) of the vehicle, and then may determine the altitude from the OMap data at that location (e.g., that latitude and that longitude). Some embodiments may then determine the roll and pitch value of the vehicle based on a ground plane as follows:
1. The localization module 260 may determine the approximate location of the vehicle, for example, based on GNSS or a combination of GNSS and IMU data.
2. The localization module 260 may load a portion of the HD map (e.g., OMap data representing a 3D point cloud) including the determined location. The HD map may be determined based on vehicles that previously travelled through the region in which the vehicle is present.
3. The localization module 260 may determine the points representing the ground plane at the location of the vehicle from the HD map data.
4. The localization module 260 may determine the roll, pitch, and altitude values of the ground plane based on the OMap data. The localization module 260 may use the roll, pitch, and altitude values of the ground plane as the roll, pitch, and altitude values of the vehicle.

Segmenting Ground Points and Non-Ground Points in Point Cloud Matching

In some embodiments, the localization module 260 may use matching, such as by performing any iterative closet point (ICP) algorithm that matches two point clouds by directly performing a Singular Value Decomposition (SVD) on the correspondences and estimating the transform. One such algorithm is disclosed in Segal, A., Haehnel, D., & Thrun, S. (2009), Generalized-ICP. Robotics: Science and Systems, 5, 168-176 which is incorporated by reference herein in its entirety for all that it discloses. In some embodiments, the localization module 260 may detect other vehicles in front of the vehicle, for example in traffic. Performing conventional ICP may result in finding correspondences between points on wheels of these vehicles and ground points since the two types of points are close together. These are incorrect correspondences since points on a dynamic object (e.g., on wheels of a vehicle) are being matched to points on a static object (ground). As a result, the estimates of the roll, pitch, and altitude of the vehicle may be inaccurate. For example, the altitude (e.g., the z coordinate) of the vehicle may be determined to be lower than it should be.

In some embodiments, the localization module 260 may segment each point cloud into two chunks, ground points and non-ground points. In these embodiments, the localization module 260 may group the ground-to-ground (G2G)

and non-ground-to-non-ground (N2N) correspondences together and may perform the normal ICP transform estimation separately for the two sets of points. By doing this, the localization module 260 may reduce the effect of dynamic objects (e.g., other vehicles). In some embodiments, the localization module 260 may apply different weights on the correspondences, for example, by making N2N correspondences have a higher weight than G2G correspondences (e.g., by making N2N correspondences have two times higher weight than G2G correspondences). In some embodiments, this process may be particularly useful for bootstrapping.

In some embodiments, an ICP algorithm may iteratively repeat the following two steps: (1) compute correspondences between two scans, and (2) compute a transformation which minimizes distance between corresponding points. Iteratively repeating these two steps may typically result in convergence to a desired transformation. In some embodiments, steps of an ICP algorithm may include the following:

```
input: Two pointclouds: A = {a_i}, B = {b_i}
An initial transformation: T_0
output: The correct transformation, T, which aligns A
and B
    1       T ← T_0;
    2       while not converged do
    3           for i ← 1 to N do
    4               m_i ← FindClosestPointInA (T · b_i);
    5               if ||m_i − T · b_i|| ≤ d_max then
    6                   w_i ← 1;
    7               else
    8                   w_i ← 0;
    9               end
   10           end
   11
```
$$T \leftarrow \underset{T}{\operatorname{argmin}} \left\{ \sum_i w_i \| T \cdot b_i - m_i \|^2 \right\};$$
```
   12       end
```

In some embodiments, the point-to-plane variant of ICP may improves performance by taking advantage of surface normal information. The point-to-plane algorithm may minimize error along the surface normal (e.g., the projection of $(T \cdot b_i - m_i)$ onto the sub-space spanned by the surface normal). This improvement may implemented by changing line 11 of above ICP algorithm as follows:

$$T \leftarrow \underset{T}{\operatorname{argmin}} \left\{ \sum_i w_i \| \eta_i \cdot (T \cdot b_i - m_i) \|^2 \right\}$$

In some embodiments, the localization module 260 may perform ICP or any technique of point cloud matching that separately matches ground points and non-ground points. Separating the ground points from non-ground points may avoid matching of non-ground points (e.g., points on wheels of vehicles) with ground points. In some embodiments, this may be accomplished as follows:
1. Receive a source point cloud Ps and a target point cloud Pt for matching Ps and Pt (e.g., via ICP)
2. Determine ground points and non-ground points for each point cloud Ps and Pt:
   a. GPs is the set of ground points from point cloud Ps and GPt is the set of ground points from point cloud Pt
   b. NPs is the set of non-ground points from point cloud Ps and NPt is the set of non-ground points from point cloud Pt
3. Perform ICP to match GPs with GPs
4. Perform ICP to match matches NPs with NPt In some embodiments, the localization module 260 may assign higher weights to non-ground points compared to ground points while performing ICP, as follows:
1. Receive a source point cloud Ps and a target point cloud Pt for matching Ps and Pt (e.g., via ICP)
2. Determine ground points and non-ground points for each point cloud Ps and Pt:
   a. GPs is the set of ground points from point cloud Ps and GPt is the set of ground points from point cloud Pt
   b. NPs is the set of non-ground points from point cloud Ps and NPt is the set of non-ground points from point cloud Pt
3. Perform ICP to match Ps with Pt such that points in NPs and NPt are assigned higher weights compared to points of GPs and GPt.

In some embodiments, another way to use the matching is to separate the 6D degree of freedom (DOF) into two sub-problems: one problem for roll, pitch, and altitude (e.g., z coordinate), and another problem from x, y, and yaw coordinates. Since the ground points may usually be flat 2D planes, the ground-to-ground matching may help the localization module 260 out the correct roll, pitch and z values if the x, y, and yaw value are known. The localization module 260 may first use the initial guess pose to do the non-ground matching to fix the correct x, y, and yaw value. The localization module 260 may next correct the roll, pitch, and z values by using the ground matching. This may magnify the effect of the non-ground points on the X, Y convergence, but subject to that the environment containing many non-ground features.

In some embodiments, the points on dynamic objects (e.g., points on vehicles) do not match any point in the OMap point cloud, and therefore get eliminated from the result. In regions where there are very few structures, features on the ground (e.g., cracks in road, pot holes, curves on the road, etc.) may help localization to converge.

In some embodiments, assuming there are N LIDAR scan points and M map points, the query of the nearest neighbor algorithm may be log(M). Then the total scan correspondence finding may be N*log(M). Assuming half of the points are ground points in the LIDAR scan and in the map, then with the G2G and N2N, the final complexity may be 2*N/2*N*log(M/2) which equals N*log(M/2). But when M is relatively large (e.g., 1 million points), the actual performance benefit may be only log(M)/log(M/2)=1.05. In some embodiments, many points on a dynamic object (e.g., points on a vehicle) may find correspondences, so the nearest neighbor search for those points may be faster (e.g., due to a property of a kd-tree).

In some embodiments, using the ground points from the HD map, the localization module 260 may perform other actions to help with localization. For example, the localization module 260 may directly uses the ground points from the HD map to reset any localization approach's roll, pitch, and z value by looking-up the ground patch at that x, y, and yaw location (e.g., if a localization algorithm only generates a 2D pose: x, y, and yaw, the localization module 260 may directly look up the ground map, and find the ground patch at the x, y location). The localization module 260 may do a plane fitting on the ground points to find out the roll, pitch, and z values for that ground patch. This may be performed under the assumption that cars are always on the ground. Other layer info may be required for places that have multiple levels of grounds such as overpasses and garages.

Roll and pitch values may be less accurate when the vehicle is on the bumps or in holes such as on non-flat roads.

Figure 11:
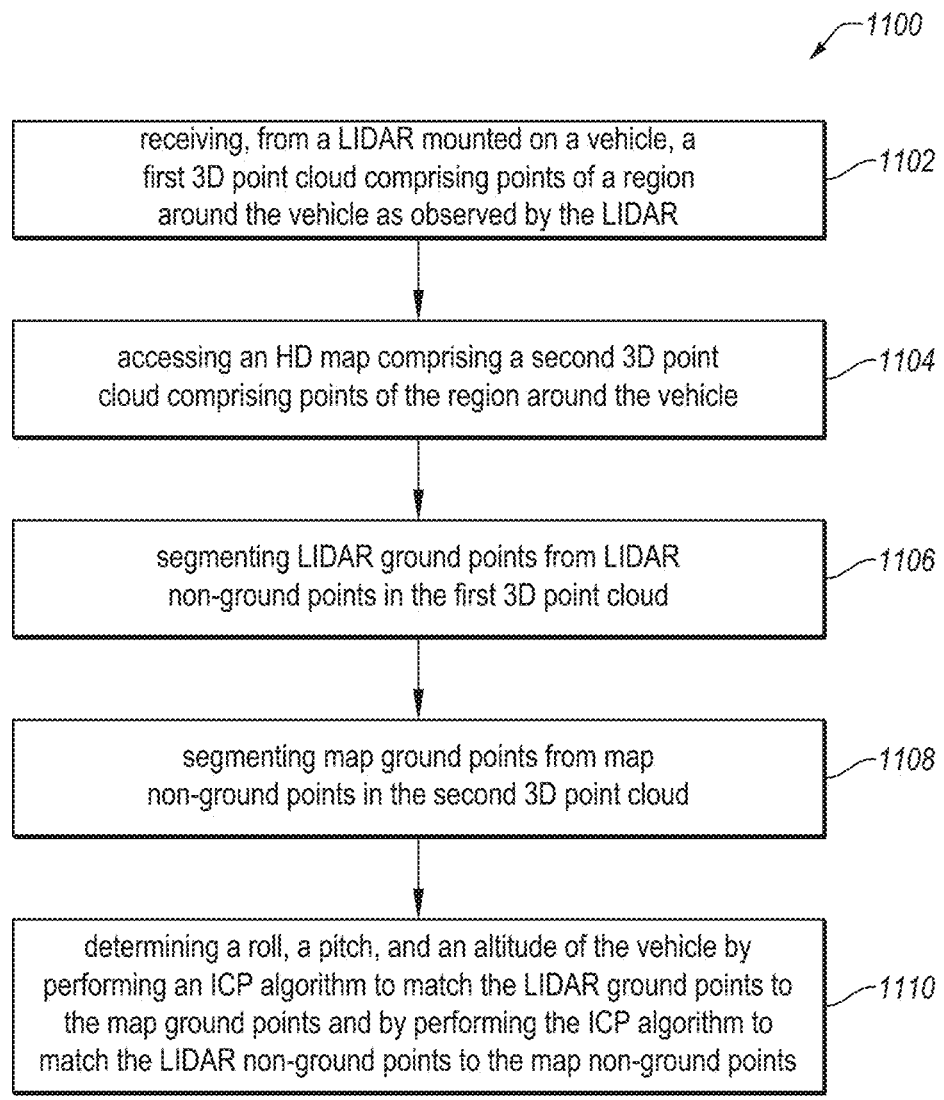
FIG. 11 illustrates a flow chart of an example method of segmenting ground points from non-ground points to assist with localization of a vehicle.

FIG. 11 illustrates a flow chart of an example method 1100 of segmenting ground points from non-ground points to assist with localization of a vehicle. In some embodiments, the method 1100 may be employed by the localization module 260 of the vehicle computing system 120 to assist with localization of the vehicle 150. The method 1100 may be performed by any suitable system, apparatus, or device. For example, one or more elements of the HD map system 100 of FIG. 1 may be configured to perform one or more of the operations of the method 1100. Additionally or alternatively, the computer system 1200 of FIG. 12 may be configured to perform one or more of the operations associated with the method 1100. Although illustrated with discrete blocks, the actions and operations associated with one or more of the blocks of the method 1100 may be divided into additional blocks, combined into fewer blocks, or eliminated, depending on the particular implementation.

The method 1100 may include, at action 1102, receiving, from a LIDAR mounted on a vehicle, a first 3D point cloud comprising points of a region around the vehicle as observed by the LIDAR. For example, the localization module 260 may receive, at action 1102, a first 3D point cloud comprising points of a region around the vehicle 150 from a LIDAR mounted on a vehicle 150 as the vehicle 150 navigates along a road.

The method 1100 may include, at action 1104, accessing an HD map comprising a second 3D point cloud comprising points of the region around the vehicle. For example, the localization module 260 may access, at action 1104, an OMap of an HD map comprising a second 3D point cloud comprising points of the region around the vehicle 150 as the vehicle 150 navigates along a road. The OMap may be accessed by being downloaded from the online HD map store 165, or by being previously downloaded and then retrieved from the local HD map store 275.

The method 1100 may include, at action 1106, segmenting LIDAR ground points from LIDAR non-ground points in the first 3D point cloud. The method 1100 may include, at action 1108, segmenting map ground points from map non-ground points in the second 3D point cloud. In some embodiments, the action 1106 and/or the action 1108 may be performed using a random sample consensus (RANSAC) algorithm. In some embodiments, the action 1106 and/or the action 1108 may be performed using a range-based segmentation algorithm. For example, the localization module 260 may segment, at action 1106, LIDAR ground points from LIDAR non-ground points in the first 3D point cloud. Further, the localization module 260 may segment, at action 1106, map ground points from map non-ground points in the second 3D point cloud. In another example, the segmenting of the map ground points from the map non-ground points may be performed at the online HD map system previously, and the localization module 260 may simply access labels or other indicators of this prior segmentation at action 1108.

The method 1100 may include, at action 1110, determining a pose of the vehicle by performing an ICP algorithm to match the LIDAR ground points to the map ground points and by performing the ICP algorithm to match the LIDAR non-ground points to the map non-ground points. In some embodiments, the performing of the ICP algorithm to match the LIDAR ground points to the map ground points may be performed separately from the performing of the ICP algorithm to match the LIDAR non-ground points to the map non-ground points. In some embodiments, during the performances of the ICP algorithm, a higher weight may be applied to correspondences between the LIDAR non-ground points and the map non-ground points than to correspondences between the LIDAR ground points and the map ground points. In some embodiments, a roll, a pitch, and an altitude of the pose may be determined by performing the ICP algorithm to match the LIDAR ground points to the map ground points. In some embodiments, an x coordinate, a y coordinate, and a yaw of the pose may be determined by performing the ICP algorithm to match the LIDAR non-ground points to the map non-ground points. In some embodiments, the matching of the ground points and the non-ground points may be accomplished using a method other than an ICP algorithm. For example, the localization module 260 may determine, at action 1110, a pose of the vehicle 150 by performing an ICP algorithm to match the LIDAR ground points to the map ground points and by performing (either separately or using higher weights) the ICP algorithm to match the LIDAR non-ground points to the map non-ground points.

Subsequent to the action 1110, the method 1100 may employ the determined roll, pitch, and altitude (e.g., of the vehicle pose) of the vehicle 150 in gathering data to update the HD map store 165, and/or in navigating the vehicle 150 based on the more determined roll, pitch, and altitude of the vehicle 150. Further, the method 1100 may be employed repeatedly as the vehicle 150 navigates along a road. For example, the method 1100 may be employed when the vehicle 150 (or another non-autonomous vehicle) starts driving, and then may be employed repeatedly during the navigation of the vehicle 150 (or another non-autonomous vehicle). The vehicle 150 may navigate by sending control signals to controls of the vehicle 150. The method 1100 may be employed by the vehicle computing system 120 of the vehicle 150 to segment the LIDAR ground points from the LIDAR non-ground points to reduce or eliminate inadvertent matching of points on dynamic objects from the LIDAR with points on the ground from the HD map resulting in a more accurate determining of the roll, the pitch, and the altitude of the vehicle 150.

Computer System Architecture

Figure 12:
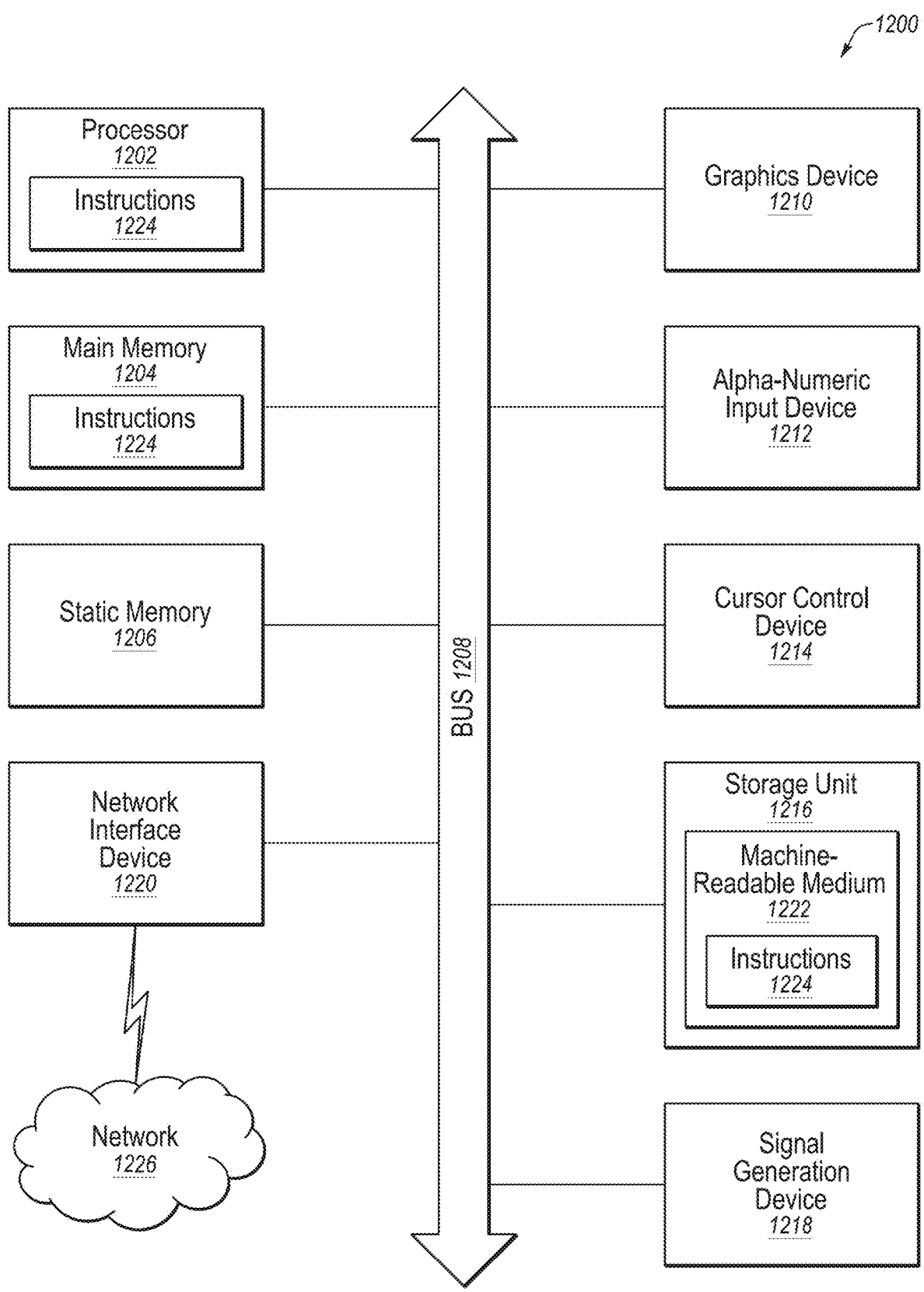
FIG. 12 illustrates an example embodiment of a computing machine that can read instructions from a machine-readable medium and execute the instructions in a processor or controller.

FIG. 12 is a block diagram illustrating components of an example computer system able to read instructions from a machine-readable medium and execute them in a processor (or controller). Specifically, FIG. 12 shows a diagrammatic representation of a machine in the example form of a computer system 1200 within which instructions 1224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 may be part of or may be any applicable system described in the present disclosure. For example, the online HD map system 110 and/or the vehicle computing systems 120 described above may comprise the computer system 1200 or one or more portions of the computer system 1200. Further, different implementations of the computer system 1200 may include more or fewer components than those described herein. For example, a particular computer system 1200 may not include one or more of the elements described herein and/or may include one or more elements that are not explicitly discussed.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   receiving a first three dimensional (3D) point cloud comprising points corresponding to a region around a vehicle as observed by a light detection and ranging (LIDAR) sensor mounted on the vehicle;
   accessing a high definition (HD) map comprising a second 3D point cloud comprising points corresponding to the region around the vehicle;
   segmenting LIDAR ground points from LIDAR non-ground points in the first 3D point cloud;
   segmenting map ground points from map non-ground points in the second 3D point cloud;
   determining a first correspondence between one or more LIDAR ground points and one or more map ground points;
   determining a second correspondence between one or more LIDAR non-ground points and one or more map non-ground points; and
   determining a pose of the vehicle based at least on the first correspondence and the second correspondence.

2. The method of claim 1, wherein the segmenting of the LIDAR ground points from the LIDAR non-ground points in the first 3D point cloud and the segmenting of the map ground points from the map non-ground points in the second 3D point cloud are performed using a random sample consensus (RANSAC) algorithm.

3. The method of claim 1, wherein the segmenting of the LIDAR ground points from the LIDAR non-ground points in the first 3D point cloud and the segmenting of the map ground points from the map non-ground points in the second 3D point cloud are performed using a range-based segmentation algorithm.

4. The method of claim 1, wherein the determining the first correspondence is performed separately from the determining the second correspondence.

5. The method of claim 1, wherein a different weight is applied to the first correspondence than to the second correspondence.

6. The method of claim 1, wherein:
   a roll, a pitch, and an altitude of the pose is determined by performing an iterative closet point (ICP) algorithm to match the one or more LIDAR ground points to the one or more map ground points; and
   an x coordinate, a y coordinate, and a yaw of the pose is determined by performing the ICP algorithm to match the one or more LIDAR non-ground points to the one or more map non-ground points.

7. A processor comprising:
   processing circuitry to cause performance of operations comprising:
      receiving a first three dimensional (3D) point cloud comprising points corresponding to a region around a vehicle as observed by a light detection and ranging (LIDAR) sensor mounted on the vehicle;
      accessing a high definition (HD) map comprising a second 3D point cloud comprising points corresponding to the region around the vehicle;
      segmenting LIDAR ground points from LIDAR non-ground points in the first 3D point cloud;
      segmenting map ground points from map non-ground points in the second 3D point cloud;
      matching points of the first 3D point cloud to points of the second 3D point cloud, the matching including the LIDAR ground points only being compared against the map ground points and the LIDAR non-ground points only being compared against the map non-ground points; and determining a pose of the vehicle based at least on the matching, wherein matches between the LIDAR ground points and the map ground points are weighted differently than matches between the LIDAR non-ground points and the map non-ground points in the determining the pose.

8. The processor of claim 7, wherein the segmenting of the LIDAR ground points from the LIDAR non-ground points in the first 3D point cloud and the segmenting of the map ground points from the map non-ground points in the second 3D point cloud are performed using a random sample consensus (RANSAC) algorithm.

9. The processor of claim 7, wherein the segmenting of the LIDAR ground points from the LIDAR non-ground points in the first 3D point cloud and the segmenting of the map ground points from the map non-ground points in the second 3D point cloud are performed using a range-based segmentation algorithm.

10. The processor of claim 7, wherein the LIDAR ground points are compared to the map ground points separately from the LIDAR non-ground points being compared to the map non-ground points.

11. The processor of claim 7, wherein a higher weight is applied to the matches between the LIDAR non-ground points and the map non-ground points than to the matches between the LIDAR ground points and the map ground points.

12. The processor of claim 7, wherein:

a roll, a pitch, and an altitude of the pose is determined by performing an iterative closet point (ICP) algorithm to match the LIDAR ground points to the map ground points; and an x coordinate, a y coordinate, and a yaw of the pose is determined by performing the ICP algorithm to match the LIDAR non-ground points to the map non-ground points.

13. A system comprising:

one or more processing units to perform operations comprising:

receiving a first three dimensional (3D) point cloud comprising points corresponding to a region around a vehicle as observed by a light detection and ranging (LIDAR) sensor mounted on the vehicle;

accessing a high definition (HD) map comprising a second 3D point cloud comprising points corresponding to the region around the vehicle;

segmenting LIDAR ground points from LIDAR non-ground points in the first 3D point cloud;

segmenting map ground points from map non-ground points in the second 3D point cloud;

determining a first correspondence between one or more LIDAR ground points and one or more map ground points;

determining a second correspondence between one or more LIDAR non-ground points and one or more map non-ground points; and determining a pose of the vehicle based at least on the first correspondence and the second correspondence.

14. The system of claim 13, wherein the segmenting of the LIDAR ground points from the LIDAR non-ground points in the first 3D point cloud and the segmenting of the map ground points from the map non-ground points in the second 3D point cloud are performed using a random sample consensus (RANSAC) algorithm.

15. The system of claim 13, wherein the segmenting of the LIDAR ground points from the LIDAR non-ground points in the first 3D point cloud and the segmenting of the map ground points from the map non-ground points in the second 3D point cloud are performed using a range-based segmentation algorithm.

16. The system of claim 13 wherein the determining the first correspondence is performed separately from the determining the second correspondence.

17. The system of claim 13, wherein a different weight is applied to the first correspondence than to the second correspondence.

18. The system of claim 13, wherein:

a roll, a pitch, and an altitude of the pose is determined by performing an iterative closet point (ICP) algorithm to match the one or more LIDAR ground points to the one or more map ground points; and an x coordinate, a y coordinate, and a yaw of the pose is determined by performing the ICP algorithm to match the one or more LIDAR non-ground points to the one or more map non-ground points.

* * * * *